Nov. 21, 1961     G. DE MESTRAL     3,009,235

SEPARABLE FASTENING DEVICE

Filed May 9, 1958     4 Sheets—Sheet 1

Nov. 21, 1961  G. DE MESTRAL  3,009,235
SEPARABLE FASTENING DEVICE
Filed May 9, 1958  4 Sheets-Sheet 3
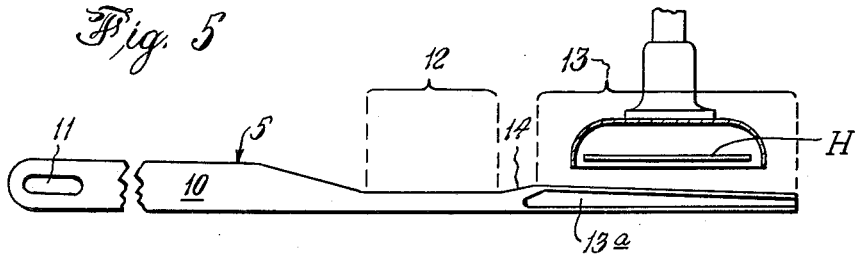
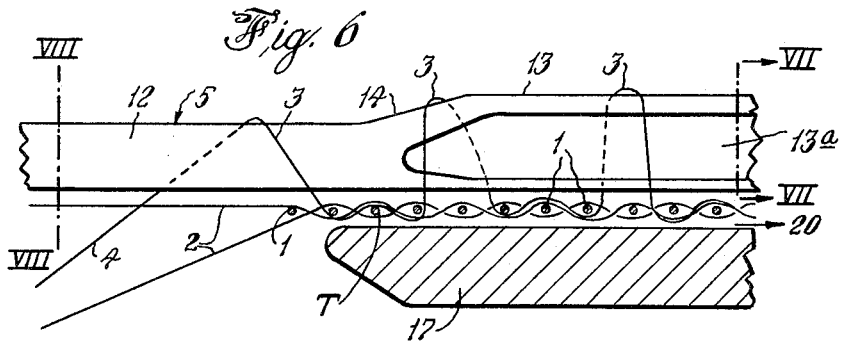
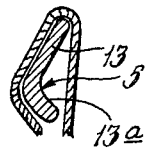
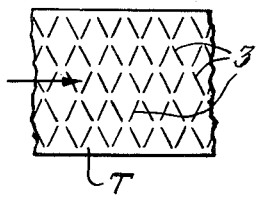
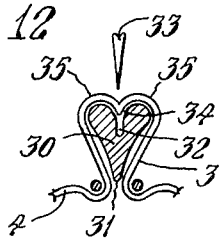
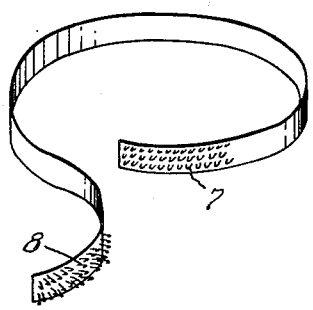

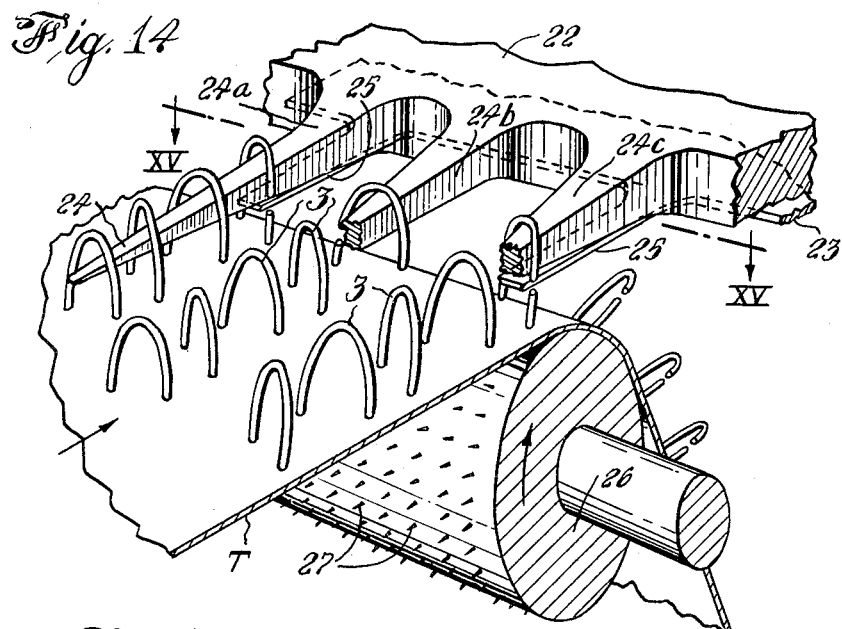
Fig. 14
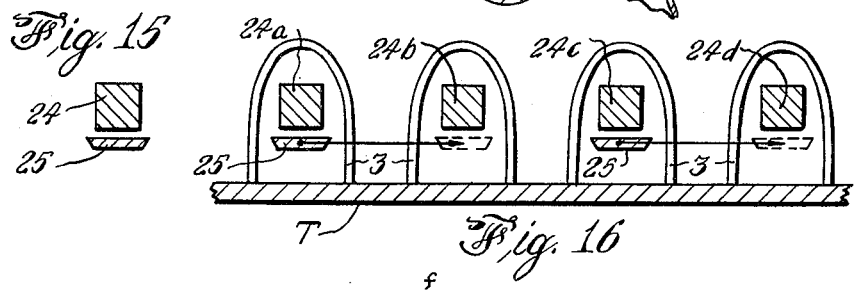
Fig. 15
Fig. 16
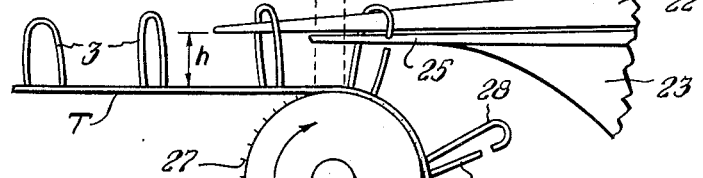
Fig. 17
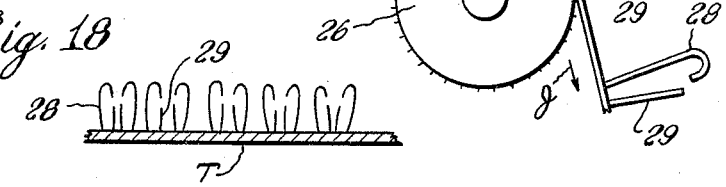
Fig. 18

United States Patent Office 3,009,235
Patented Nov. 21, 1961

3,009,235
SEPARABLE FASTENING DEVICE
George de Mestral, Nyon, Switzerland, assignor to International Velcro Company, Estab., Nyon, Switzerland, a corporation of Liechtenstein
Filed May 9, 1958, Ser. No. 734,347
Claims priority, application Switzerland Oct. 2, 1957
9 Claims. (Cl. 28—78)

From Swiss Patent No. 295,638 and United States Patent No. 2,717,437, respectively, there is known a separable fastening device comprising two elements, in that case, two layers of woven fabric of the velvet type in which the loops have been cut to form hooks. The hooks of these layers of fabric are formed by a thread of artificial material, such as nylon or similar materials, so that they are capable of preserving their shape after cutting the loops to form hooks. The preservation of the shape of the hooks is obtained by a thermal treatment appropriate for the particular artificial material used.

It will be understood that when two layers of this type are pressed into face to face relation a substantial percentage of the hooks engage with one another, and the two layers are thus hooked one to the other. Separation requires a force of a considerable magnitude when it is attempted to release a large number of hooks at once but separation may be quite readily effected by progressively peeling the layers apart. Hooking or connecting devices of this character are adapted to be used, for example, as closing devices for clothing, blinds or the like, thus replacing slide fasteners, buttons and other attachments of this type, particularly when a flexible closure, which is invisible and can be opened easily, is desirable.

It has been found that the use of one layer of fabric of the hooked velvet type, as described above, with a layer of fabric of the loop-type, such as terry or uncut velvet, provides greatly improved resistance to separation of the two layers of fabric.

Experience has shown that a hooked layer, of the type disclosed in said Patent 2,717,437, provided, for example with 120 hooks per square centimeter has a relatively large portion of its surface which is not provided with hooks. As a result, only about 30% of the total number of hooks come into engagement with other hooks when two layers of such hooked fabric are pressed together. In contrast with this, when one such layer with hooks is pressed against a layer having, for example, about 1000 loops per square centimeter, the possibilities of hooking are considerably augmented.

The present invention therefore has for its object the provision of a separable fastener consisting of two elements provided with cooperating hooking members characterised in that one of said elements is provided with hooks and the other with loops.

For the purpose of further enhancing the firmness of engagement of such a separable fastener the present invention provides several alternative constructions which increase the probabilities of engagement of the hooks with the loops so that a major percentage, if not all, of the hooks on the hook-carrying element will become engaged with a loop on the other element. For this purpose, there is disclosed a process of manufacture of the elements of such separable fasteners characterized in that the hooking members, whether loops or hooks, are formed in such a manner that they are located in different planes. Said loops or hooks may thus be directed in different planes relatively to one another, or have their summits located in planes disposed at different levels relative to that of the base fabric or other support on which they are carried.

There is also disclosed apparatus suitable for manufacture of the elements of such separable fasteners comprising a weaving loom having bars or lancets disposed parallel to those warp threads of the fabric which are utilized for forming loops. In one form of such apparatus the bars or lancets have a portion of reduced cross-section on which the loops are formed, said portion being followed by a portion of larger cross-section, adapted to tension the loops after their formation, said two portions being connected together by a connecting ramp.

In the accompanying drawings there are shown diagrammatically and by way of example, a number of forms of elements of the separable fastener of the present invention and of apparatus as well as method suitable for manufacture of said fastener and elements thereof.

In the drawings:

FIG. 5 is a side view of a bar or lancet which may be used in the weaving loom;

FIG. 6 is a view on a larger scale of the portion of the bar on which the loops are formed;

FIG. 7 is a section on the line VII—VII of FIG. 6;

FIG. 8 is a section on the line VIII—VIII of FIG. 6;

FIG. 9 is a diagrammatic view, from above, of a typical fabric embodying the present invention;

FIG. 12 shows a device for cutting the loops so as to form hooks;

FIG. 13 shows a typical application of the separable fastener of the present invention;

FIG. 14 is a fragmentary view, in perspective, of a device for cutting the loops so as to form hooks;

FIG. 15 is a fragmentary section on the line XV—XV of FIG. 14;

FIGS. 16 and 17 show the manner in which the cutting device of FIG. 14 operates for forming hooks; and FIG. 18 shows in conventionalized section, a fabric of the velvet type in which the pile has been cut to form hooks.

Figure 1:
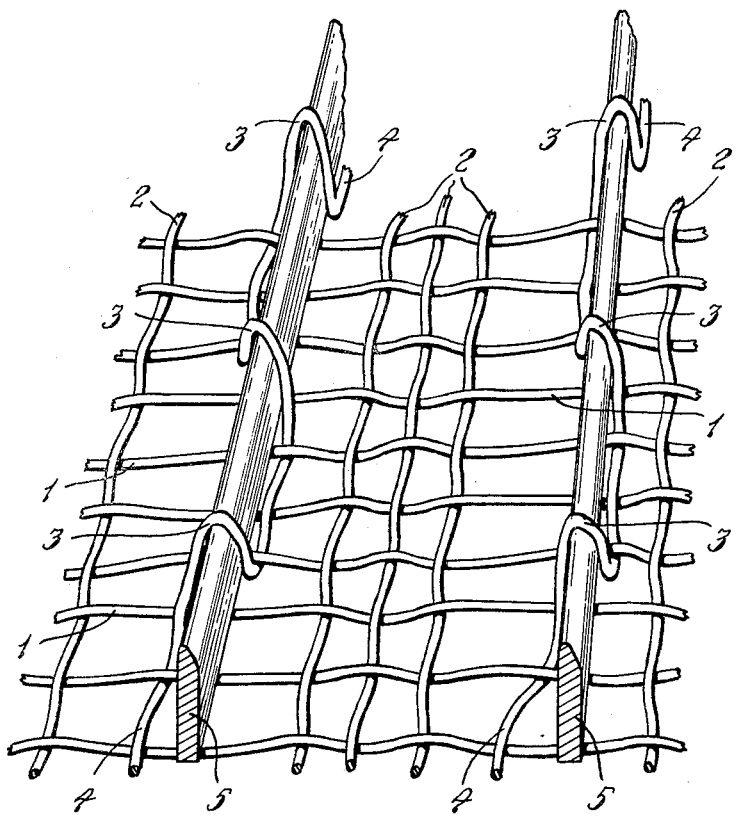
FIG. 1 is an enlarged diagrammatic view illustrating a portion of an apparatus and a method for the weaving of either hooked or looped fabrics suitable for the present invention.
Figure 1A:
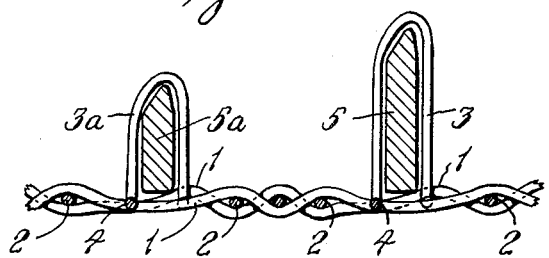
FIG. 1a is a section transverse the warp threads, showing a modification of the apparatus shown in FIG. 1.

With reference to FIG. 1, the terry or velvet-type uncut fabric illustrated is manufactured by forming a base fabric which comprises a number of firmly woven weft threads 1 and warp threads 2. It will be understood that a large number of warp threads 2 have been omitted and that the weft threads 1 have been shown spread apart. The loops 3 of said fabric are formed in supplementary warp threads 4 passed over metal bars 5 in the form of lancets during the weaving operation, in a loom of the general type employed in weaving velvet ribbon. Said supplementary warp threads 4 preferably are of artificial material, such as nylon or other material capable of being set by heat into a predetermined form. Such supplemental warps are thus capable of retaining by reason of thermal heat treatment, the shape which has been imparted thereto during weaving. Said supplementary warp threads 4 may be monofilaments, which are preferred for the manufacture of the hooked elements of the present invention or multifilaments which are preferred for the manufacture of the looped elements. In the modification shown in FIG. 1a the lancets 5 and 5a may be of different height to form loops 3 and 3a of which the tops are located in planes at different levels relatively to the general plane of the base fabric.

Figure 2:
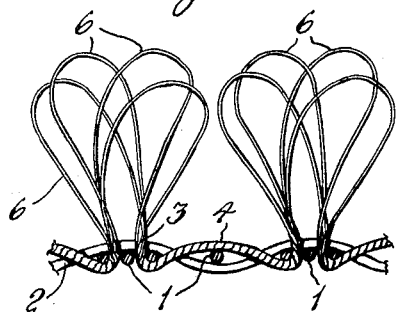
FIG. 2 shows diagrammatically a looped fabric in which the loops have been formed from a multifilament yarn and in which the loops have been subjected to an opening operation.

The fabric shown in FIG. 2 is a looped fabric woven as illustrated in FIG. 1 with rows 5 all having substantially the same cross-section. Said fabric includes supplementary warp threads 4 of the multifilament type. A fabric of this character is subjected after its weaving operation to a brushing provoking a separation from one another, in each loop 3, of the filaments 6 forming the threads 4, without breaking the loops. The loops formed by each filament 6 are spread into fan shape by brushing, so that they are located in different planes as shown in FIG. 2, which is a sectional view perpendicular to the wefts 1 and in FIG. 3 which is a sectional view perpendicular to the warps 2 and 4 but in which the base fabric is diagrammatically indicated by the reference numeral 7. A looped fabric of this character affords a multiplying of the number of probabilities of engagement with the hooks in a hooked fabric as will be described below. After the brushing operation the loops may be fixed or stabilized so that they retain their shape and their position. This fixing or stabilization may be effected by heat setting or by impregnation of the fabric, for example by adhesive products, or both. In this manner a very large number of durable and firmly anchored loops are provided.

Figure 3:
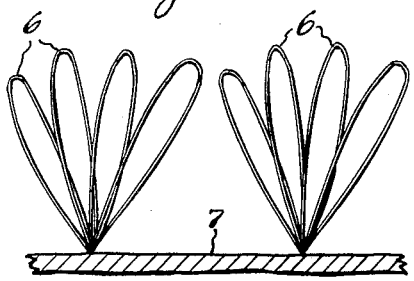
FIG. 3 shows diagrammatically the same fabric as in FIG. 2 looking in a plane perpendicular to FIG. 2.
Figure 4:
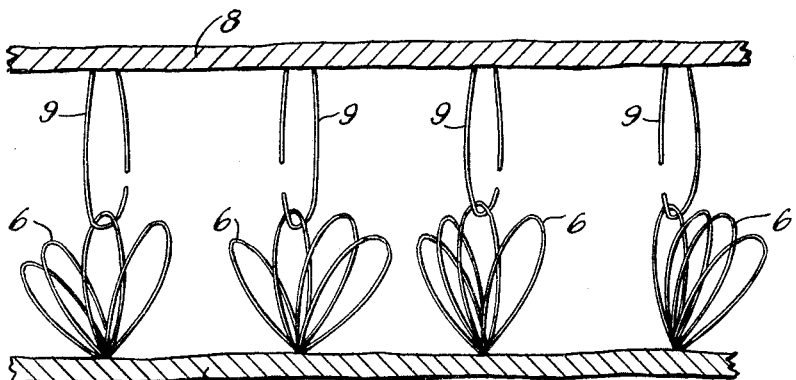
FIG. 4 is a diagrammatic, enlarged view of a typical separable fastener embodying the present invention.

FIG. 4 shows diagrammatically a separable fastener comprising a layer of fabric 7 with loops 6 of the type shown in FIGS. 2 and 3, in hooking engagement with a layer of fabric 8 provided with hooks 9.

FIGS. 5 to 8 illustrate apparatus and a process of manufacture of hooked or looped fabrics suitable for use as elements of the fastener of the present invention. These figures show novel features of a weaving loom which may be used for carrying out said process. Said loom is distinguished particularly by the shape of the metal bars or lancets 5 used for the formation of the loops 3 of the fabric shown in FIG. 1 which fabric may comprise the hooked or loop fabric elements of the present invention.

With reference to FIG. 5, each bar or lancet 5 comprises an elongated element 10 provided at one of its ends with an opening 11 enabling it to be hooked on the weaving loom. Said element 10 comprises a portion 12 of reduced section on which are formed the loops of the fabric. Said portion 12 is followed by a portion 13 of larger section adapted to tension the loops after their formation. Said two portions 12 and 13 are connected together by a connecting ramp 14, of which the height increases progressively from the portion 12 to the portion 13.

The elongated element 10 has the shape of a flat blade over the major portion of its length, that is to say from the opening 11 through the portion 12 of reduced cross-section (FIG. 8), to allow the comb of the loom to slide easily. However, in the portion 13, as shown in FIG. 7, the effective cross-section of said blade is increased not only vertically, as mentioned above but also horizontally to impart to each tensioned loop a transversely enlarged shape at its central portion. Said shape facilitates the cutting operation to be described below. The increased horizontal cross-section of the portion 13 of the blade may be achieved by curving this portion inwardly, as shown in FIG. 7, with the further advantage that only about one-half of the length of each tensioned loop is in frictional contact with a surface of the blade. The lancets 5 may be formed from thin steel blades in which event they may be shaped in a press.

The operation of the lancets in the loom is shown diagrammatically in FIG. 6 in which is shown a base fabric T formed of warp threads 2 and weft threads 1. Said fabric T moves progressively across a support 17 in the direction indicated by arrow 20, as it is woven and the loops slide along the lancets 5 progressively engaging the portions 10, 12 and 13 thereof. The warps 4 which form the loops 3 are directed first to one side and then to the other side of each bar 5 to assume the configurations shown in FIG. 1. This is done by special heddles called "doupes" which are well known in the weaving of leno fabrics. The doupes are not shown in the drawings.

The loops 3 are thus formed on the reduced-section portions 12 of the bars or lancets 5 as the fabric advances in the direction of the arrow. The loops 3 then slide up the ramps 14 and on to the portions 13 which, because of their large cross-section serve to individually tension each of the loops 3. Such tensioning of all the loops 3 along the portions 13 of each bar insures the formation of a firm fabric with the upstanding loops positioned in a uniform manner as diagrammatically illustrated in FIG. 9.

The use of rods or lancets of this character permits the establishment of a relatively low initial tension on the warps 4. For example, with lancets of conventional design an initial tension in the order of 2 kilos is frequently necessary. With the novel lancets 5 of the present invention a tension in the order of 200 grams will produce a fabric of at least equivalent firmness and uniformity. It will be apparent that the risks of breaking of the warp threads are very substantially reduced.

The loops 3, formed on the ground T according to the process illustrated diagrammatically in FIGS. 1 and 6, are preferably heat set while they remain on the lancets 5, as by a heater H, shown in FIG. 5. The loops 3 are disposed diagonally and preferably in opposite arrangement in adjacent rows as indicated in FIG. 9. Thus the fabric presents a chevron or moiré effect. The loops 3 are thus located in different vertical planes relative to one another. Further, the loops 3 may all be of the same height as the result of the use of lancets 5 of identical shape and size as shown in FIG. 1 or they may be of different heights in different rows as the result of using lancets of different sizes. Thus in FIG. 1a a lancet 5 may be of one size whereas a lancet 5a may be of different size so as to produce loops 3a of different height.

Figure 10:
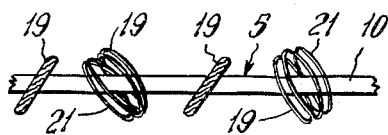
FIG. 10 illustrates a modification of the looped fabric.
Figure 11:
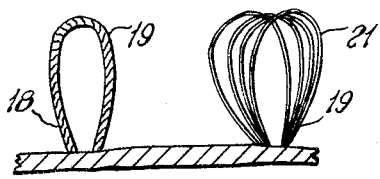
FIG. 11 is a fragmentary view of the fabric shown in FIG. 10.

FIGS. 10 and 11 show diagrammatically, in plan and side view, a modification of the fabric which may be produced by the process illustrated in FIGS. 1 and 6. In FIGS. 10 and 11 the warp threads 18, which are used to form loops 19, are of the multifilament type. By selecting multifilament threads or yarns 18 having an initial twist or torsion equal to the amount of untwisting which will occur as the yarns are carried in one direction across the lancets 5, every other loop in the same series will be fanned out as shown at 21 while the remaining loops 19 will be even more tightly twisted as shown at 19 in FIG. 11.

FIG. 12 shows, by way of example, one form of a device for cutting loops so as to form hooks. Said device comprises a lancet 30 having a special configuration. The loops 3 are formed on the special lancets in the same manner as illustrated in FIGS. 1 and 6. The portion of the lancet 30 which corresponds to the portion 13 in FIG. 6 has a cross-section in the shape of a heart of which the point is directed downwards. On its upper part opposite the point of the heart, the lancet is provided in its median plane with a longitudinal groove 32 opposite which is located a cutting blade 33, movable in a vertical plane.

For the purpose of forming hooks the warp thread 4 forming loops 3 usually will be a monofilament capable of heat setting as discussed above. Such warps are pressed downwardly into the groove 32 of the lancet 30 by suitable means such as rollers (not shown) during a thermal treatment which is effective to set the loops 3 in the configuration shown in FIG. 12.

The cutter 33 is thereafter moved downwardly into the groove 32 to cut the loop 3 at the point 34, whereby two opposed hooks 35 are formed from each loop 3. In this manner there is formed a larger number of hooks as each loop cut produces two.

The loops 3 may be cut in various other ways to form hooks after the heat setting step. This may be effected directly on the lancets 5 of the types shown in FIG. 1 or in FIGS. 5 through 8. However, in accordance with the present invention it is preferable to cut the loops 3 by means of a cutting device comprising relatively movable cutting blades in the form of a comb. Such a cutting device may be of the same general type as the familiar hair clipper but is distinguished therefrom by the fact that one of the blades referred to as the "movable" blade is provided, for the same width, with half as many teeth as the other blade, referred to as the "stationary" blade. The movable blade is driven in a to-and-fro movement in a direction perpendicular to the axis of the teeth, through an amplitude substantially equal to the spacing from axis to axis of two teeth of the stationary blade. Each tooth of the "movable" blade sweeps over the space occupied by a pair of adjacent teeth of the stationary blade and the intervening tooth spaces so that only one leg of each loop 3 is cut.

An example of construction of a cutting device of this character is shown diagrammatically in FIGS. 14 to 17. It comprises two blades 22 and 23 in the form of a comb. The stationary blade 22 has twice as many teeth 24 as the movable blade 23 which has relatively widely spaced teeth 25. Further, the teeth 24 of the stationary cutter 22 are extended beyond the ends of the teeth 25 of the movable blade 23.

The movable blade 23 is adapted to be driven in a reciprocatory motion in a plane parallel to the plane of contact of the blades 22 and 23 by any known mechanism. The amplitude of such motion is so selected as to be substantially equal to the spacing from axis to axis of two teeth 24 of the stationary blade 22. Thus each tooth 25 of the movable blade reciprocates between a pair of adjacent teeth 24 of the stationary blade 22. For this reason cutting can occur only between such a pair of teeth 24.

In order that the cutting device may be used for converting the loops 3 of a fabric such as that shown in FIG. 9 into hooks, a cutter-comb is constructed in which the spacing of the teeth 24 of the stationary blade 22 is equal to the spacing between adjacent rows of loops 3 as viewed in the direction of the arrow in FIG. 9. The tapering extended ends of the teeth 24 of the stationary blade each enter a row of loops 3 when the fabric is advanced in the direction indicated by the arrows in FIG. 14. Such advancement may be effected by rotation of a drive roll 26 which may be provided with a plurality of pins 27, if so desired, to insure accuracy. The rate of advance of the fabric is so synchronized with the reciprocation of the movable blade 23 that the blade 23 makes one movement from the position shown in full lines in FIG. 16 to that shown in broken lines, or the reverse thereof, each time a loop 3 reaches the zone $f$ indicated in FIG. 17. Thus only one of the legs of each loop 3 is cut by the corresponding tooth 25 of the movable blade 23 at the height $h$ in FIG. 17. After the loops 3 have been cut, they are entrained by the fabric in the direction $g$ so as to escape from the cutting device.

It will be understood that all the loops 3 which succeed one another on the tooth 24a will be cut on their right leg as viewed in FIG. 16, whilst all the loops which succeed one another on the tooth 24b will be cut on the left leg. The same operation occurs between the teeth 24c and 24d.

After the cutting operation, the loops 3 have been converted into hooks having the appearance of snap-hooks, as shown in FIGS. 17 and 18. The element 28 of each loop 3 forms the hook proper, whilst the element 29 constitutes an ordinary dressed nap. As shown in FIG. 18 the hook elements 28 in adjacent rows face in opposite directions.

In the example described above, with reference to the drawing, the movable cutter 23 is located underneath the stationary cutter 22. However, it will be understood that the respective positions of these cutters 22 and 23 may be reversed. Similarly, the dimensions and shape imparted to the teeth 24 and 25 may be selected in each particular case according to the particular construction of the looped fabric which is to be subjected to the cutting device.

The cutting device of the present invention may be utilized for the formation of hooks from loops in woven fabric bases as illustrated herein or from loops in any sort of base material. In all cases it is essential that the loops be so anchored in the base material as to remain firm after the cutting operation. In the case of textile base fabrics the loops may be so anchored as the result of appropriate weaving technique or may be anchored by the application to the fabric of a supplementary stabilizing material. For example, the base fabric may be impregnated with an adhesive and preferably may be impregnated or coated on the reverse face with a heat-settable resin capable of withstanding such temperatures as are likely to be encountered in normal usage of the separable fastener of which such hooked fabric forms a part.

The separable fastener afforded by the present invention may be utilized in a wide variety of fields such as clothing, footwear, cases, belts, curtains, tapestry and so forth. A typical illustrative use is shown in FIG. 13 in which is shown its application to a belt. A layer 7 of loop fabric is secured to one end of a belt on its outer face and a layer 8 of hook fabric is secured to the other end on its inner face. In use the layer 7 is pressed into contact with the layer 8 in desired position of adjustment and the layers will hook firmly together. A belt of this character is no longer provided with a buckle, holes or loop, and it has the great advantage of permitting of hooking at an unlimited number of points along each layer of fabric 7 and 8.

The hooked fabric 8 or the looped fabric 7 may be produced in various ways. For example, they may be woven as relatively narrow bands having a width required for the intended use. In that event a number of such bands may be woven simultaneously on a loom of the type used for weaving ribbon. Alternatively, they may be woven as a band of considerable width which may be slit to form bands of desired width. In either event the bands may be of indeterminate length from which desired lengths may be cut at will.

In another method of manufacture of the base material or support, carrying in particular the hooks, a smooth and uniform support may be used which may be constituted by a band, film or plate of synthetic material, for example of plastic material, on which are spread the previously formed hooks or elements which may be formed into hooks after being attached to the base. For obtaining a uniform distribution of such hooks or elements on the support and the arrangement thereof in a substantially vertical position relatively to the surface of the support, the hooks or elements and the support are charged with static electricity of such polarization that the hooks or elements will stand erect. It then suffices to secure the hooks to their support which may be effected, for example, by gluing or heat sealing them to the support.

In the foregoing description, reference has been made to the manufacture of supports for loops and hooks by using either fabrics or threads of synthetic material, or bands or plates of plastic material, for example. However, it will be understood that the supports may be manufactured in any material, as also the loops and hooks according to the sphere of use to which the separable fastener or connecting device is intended to be applied. Thus, the supports, as also the loops and hooks, may be of metal. The supports may also be woven from metal wires, or the hooks and loops, formed from metallic wires, may be secured to supports of woven metal, woven textile or films or plates. The separable fasteners incorporating metallic parts, particularly metallic loops and hooks, provide a resistance to separation which is greater than the devices fabricated by means of threads of plastic material, for example. Such connecting devices may thus be used for connecting the ends of transmission belts, for securing protection mats or awnings on scaffolding, for example, or even for connecting vehicles.

What is claimed is:

1. A separable fastening device comprising two members each provided with a very large number of closely spaced interengageable hooking elements, certain of said hooking elements comprising hooks made of flexible resilient material and certain of said hooking elements comprising loops of flexible resilient material, and each of said members comprising a base of sheet material with said hooking elements secured thereto in positions extending generally vertically from one surface of the base to which they are secured, the number of loops per unit area of said members being substantially greater than the number of hooks per unit area of said members whereby when said surfaces of said members are pressed toward one another in face-to-face relation a very large number of said hooks will engage a very large number of said loops to secure said members in said face-to-face relation.

2. A separable fastening device comprising two members each provided with a very large number of closely spaced interengageable hooking elements, the hooking elements on one of said members comprising hooks made of flexible resilient material and the hooking elements on the other of said members comprising loops of flexible resilient material, and each of said members comprising a base of sheet material with said hooking elements respectively secured thereto in positions extending generally vertically from one surface of the base to which they are secured, the number of loops per unit area of said members being substantially greater than the number of hooks per unit area of said members whereby when said surfaces of said members are pressed toward one another in face-to-face relation a very large number of said hooks will engage a very large number of said loops to secure said members in said face-to-face relation.

3. A separable fastening device comprising two members each provided with a very large number of closely spaced interengageable hooking elements, certain of said hooking elements comprising hooks and certain of said hooking elements comprising loops, and each of said members comprising a base fabric of woven material with said hooking elements woven therein as a pile extending generally vertically from one surface of the base fabric in which they are woven, the number of loops per unit area of said members being substantially greater than the number of hooks per unit area of said members whereby when said surfaces of said members are pressed toward one another in face-to-face relation a very large number of said hooks will engage a very large number of said loops to secure said members in said face-to-face relation.

4. A separable fastener according to claim 1 wherein certain of said hooks extend different distances from the base to which they are secured relative to the distances extended by others of said hooks.

5. A separable fastener according to claim 1 wherein certain of said loops extend different distances from the base to which they are secured relative to the distances extended by others of said loops.

6. A separable fastener according to claim 3 wherein certain of said hooks extend different distances from the base fabric in which they are woven relative to the distances extended by others of said hooks.

7. A separable fastener according to claim 3 wherein certain of said loops extend different distances from the base fabric in which they are woven relative to the distances extended by others of said loops.

8. A separable fastener in accordance with claim 3 wherein said loops each comprise a heat set multifilament yarn of synthetic resinous material woven into said base fabric.

9. A separable fastener in accordance with claim 3 wherein said loops each comprise a heat set discrete filament extending from a multifilament yarn of synthetic resinous material woven into said base fabric.

References Cited in the file of this patent

UNITED STATES PATENTS

| | | |
|---|---|---|
| 875,486 | Askins | Dec. 31, 1907 |
| 1,046,798 | Jones | Dec. 10, 1912 |
| 1,164,697 | Alsop | Dec. 21, 1915 |
| 1,237,660 | Lakin | Aug. 21, 1917 |
| 1,268,075 | Glynn | May 28, 1918 |
| 1,357,929 | Van Heusen | Nov. 2, 1920 |
| 1,519,142 | Lakin | Dec. 16, 1924 |
| 2,065,185 | Jones | Dec. 22, 1936 |
| 2,196,471 | Moody et al. | Apr. 9, 1940 |
| 2,674,271 | Rice | Apr. 6, 1954 |
| 2,717,437 | De Mestral | Sept. 13, 1955 |
| 2,718,047 | Waldes | Sept. 20, 1955 |
| 2,727,295 | Wright | Dec. 20, 1955 |
| 2,754,578 | Groat | July 17, 1956 |
| 2,790,225 | Cogovan et al. | Apr. 30, 1957 |
| 2,796,654 | Ashcroft | June 25, 1957 |
| 2,820,277 | Forster | Jan. 21, 1958 |
| 2,826,223 | Hubbard | Mar. 11, 1958 |
| 2,933,797 | De Mestral | Apr. 26, 1960 |